Oct. 9, 1956 W. C. YOUNGCLAUS 2,765,649
DEVICE FOR DETERMINING DEVIATION OF MAGNETIC COMPASSES
Filed Dec. 2, 1952 2 Sheets-Sheet 2
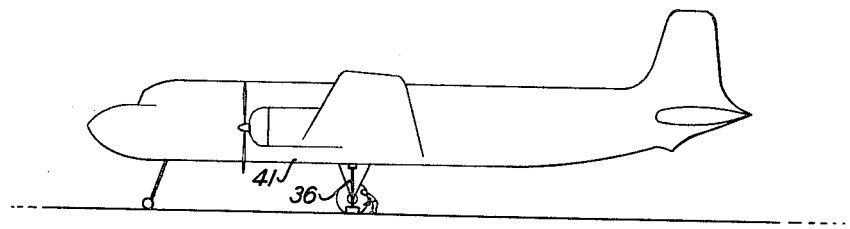
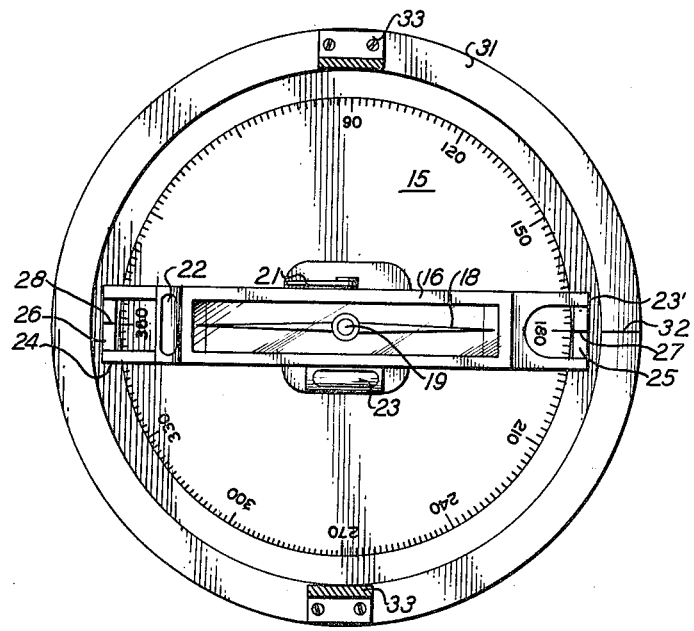
INVENTOR
WARREN C. YOUNGCLAUS
BY *Louis Burgess*
ATTORNEY

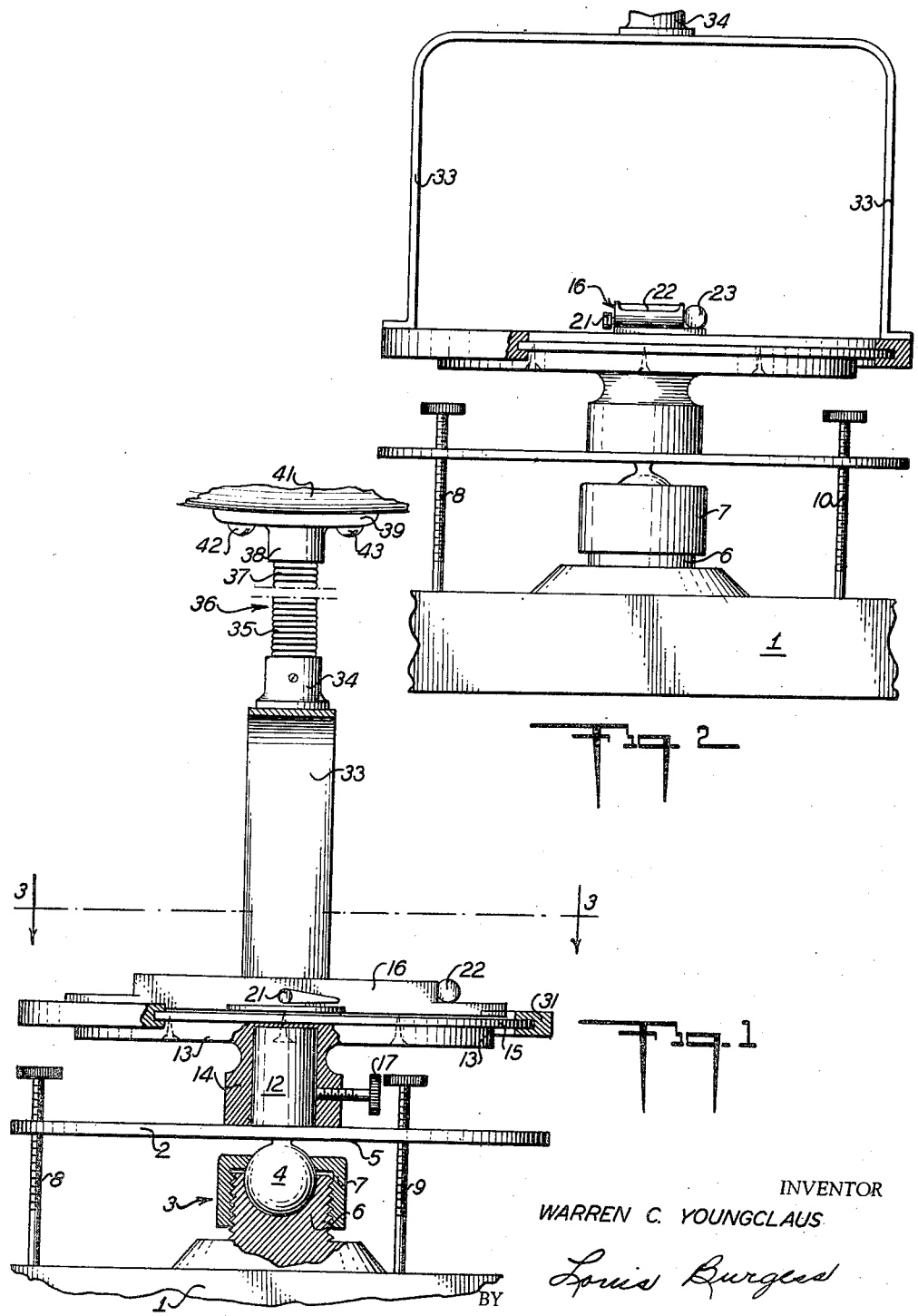

2,765,649
DEVICE FOR DETERMINING DEVIATION OF MAGNETIC COMPASSES

Warren C. Youngclaus, Garden City, N. Y.

Application December 2, 1952, Serial No. 323,691

4 Claims. (Cl. 73—1)

This invention is a new and useful device for determining the deviation of magnetic compasses installed in aircraft.

The invention will be fully understood from the following description read in conjunction with the drawings in which:

Fig. 1 is a side elevation, with parts in section, of one form of the device;

Fig. 2 is a side elevation, with parts in section, at an angle of 90° to the showing in Fig. 1;

Fig. 3 is a view of Fig. 1 on the plane indicated by 3—3; and

Fig. 4 is a side view of a plane, with parts omitted to facilitate observation, illustrating the application of my method.

The magnetic compass is one of the fundamental instruments used in aviation. Owing, however, to the mass of magnetic material in immediate proximity to the compass, it is usually inconvenient to fully compensate for the effect of local magnetic fields. For this reason the differences between the headings of the plane indicated by the compass and the actual magnetic headings of the aircraft are determined in advance under carefully controlled conditions. Based upon such observations, a chart is prepared indicating the differences. In flight the headings indicated by the compass are then corrected by reference to the chart or to a card which briefly summarizes the chart for the purpose of determining the actual magnetic heading of the aircraft at any time.

Owing the variations in the local magnetic field created by the magnetic attraction of the aircraft itself and owing also to variations in the horizontal component of the earth's magnetic field resulting from changes in geographic location, it is necessary to repeat this determination at intervals for the purpose of establishing a new chart or card. In places where these determinations are regularly made, a place is reserved on the ramp for this purpose and a permanent compass rose is marked off on the surface of the ramp at this place. The aircraft for which the deviation is to be determined is then positioned in the approximate center of the rose and turned stepwise to various magnetic headings. On each such heading the magnetic heading shown by the rose is recorded and the heading of the aircraft as indicated by the magnetic compass is also recorded. The difference between the individual headings may be of the order of 15° and the operation is repeated until the entire 360° of arc has been covered. From the observations so made, a chart is prepared showing the differences between the two readings, thereby giving the compass error, i. e., the deviation. For the convenience of the pilot a card is prepared from which the deviation may be easily read and is positioned within his field of observation while flying the aircraft.

In case, however, no such compass rose has been laid out, and particularly at temporary bases where no suitable hard surface is available, determination of the deviation presents considerable difficulty and may result in the loss of the use of the aircraft for several hours together with a considerable number of man hours. In accordance with my invention, however, the entire task of calibrating a compass can be carried to completion in any area with a total applied time of approximately 1 hour and with the services of not more than three individuals.

Referring to the drawings and particularly Figs. 1 and 2, 1 designates the base of the device of my invention. This is of some rigid, non-magnetic material, such as aluminum or brass. The base 1 may be round or square in plan and need only be of sufficient area to support the instrument properly on the local terrain. To facilitate engagement with the terrain, it may be provided with projections extending downwardly from the bottom surface thereof or fitted to a tripod or similar stand. The disc 2 rests on and is supported by base 1. It is not necessary to set the base 1 in a truly horizontal position. The disc 2 is connected to base 1 by ball and socket joint 3 consisting of ball 4 secured to undersurface 5 of disc 2 resting in socket 6, which is integral with base 1 and secured in position by cap 7 threaded to socket 6. The disc 2 may be adjusted to level position by means of thumb screws 8, 9 and 10. The upstanding stud 12 is integral with the disc 2. The disc 13 and the downwardly extending neck 14, which is integral with disc 13, are turnably mounted on stud 12. The disc 15 is secured to and carried by disc 13. It will be evident from this that discs 13 and 15 and neck 14 are turnable as a unit about stud 12. The disc 15 (Fig. 3) on its upper surface defines an azimuth ring graduated in degrees of arc and/or points of the compass. The compass needle case 16 (Figs. 1, 2 and 3) is secured to and carried by discs 13 and 15. The case 16 which is preferably provided with a glass cover, contains compass needle 18 rotatably carried by bearing 19 co-axial with stud 12. Compass needle 18 may be locked in position by lever 21 to prevent damage in transit and, pro contra, may be released to float freely on bearing 19 by throwing lever 21 through a vertical angle of 180°. Case 16 is also provided with levels 22 and 23 for use in determining when disc 2 and the other parts of the device carried thereby have been adjusted to a truly level position by means of thumb screws 8, 9 and 10. The ends 23' and 24 of case 16 are forked and provided respectively with transparent cross-bars 25 and 26 defining radial lines 27 and 28. Of these the radial line 28 is coincident with the zero graduation of the compass rose and the radial line 27 is coincident with the 180° line of the compass rose. Ring 31 rests upon the margin of disc 15 and is freely turnable with respect to the disc 15. Ring 31 defines lubber line 32. Ring 31 also carries upstanding U-bar 33 by which it may be turned with reference to disc 15. The upper surface of U-bar 33 is provided with socket 34 (Fig. 2) which socket holds, and is immobilized with reference to, the lower end 35 of flexible shaft 36. The upper end 37 of shaft 36 is in turn secured in, and immobilized with respect to, socket 38, which is an integral part of fitting 39. The fitting 39 is adapted to be temporarily secured in any suitable way to the belly 41 of an airplane. In the particular form illustrated in Figs. 1 and 2, I have shown fitting 39 secured by means of screws 42 and 43 which may be temporarily threaded into holes pre-formed in the belly of the aircraft. The relationship between ring 31, U-bar 33, flexible shaft 36 and fitting 39 is such that when these parts have been made up, the lubber line 32 coincides with the longitudinal axis of the aircraft.

Within the broad scope of my invention it will, of course, be understood that I may use any other means for operatively connecting ring 31 to the belly of the aircraft so that the lubber line 32 will be at all times coincident with the longitudinal axis of the aircraft.

In the practical application of my device, an area of the field or of the available terrain is selected, that is relatively flat and free from any objects such as rails, tanks, pipes or electrical conductors which would establish a local magnetic field. In this location the base 1 is set down horizontally and pressed firmly in position so that it will not undergo further settling or disturbance. The upper part of the device is then adjusted to a horizontal position by means of thumb screws 8, 9 and 10, and by reference to the levels 22 and 23. When this has been done lever 21 is turned to release compass needle 18 and case 16 is turned slowly until needle 18 swings freely and is accurately lined up with the markings 27 and 28, thereby determining the local magnetic meridian. Inasmuch as disc 15 is immobilized with respect to case 16, it will be evident that in this position the zero graduation of the azimuth ring is coincident with the local magnetic meridian. At this point neck 14, discs 13 and 15 and case 16 are immobilized with respect to the base 1 by advancing thumb screw 17. The operator has in this way established a compass rose or azimuth ring that is accurately oriented with respect to the local magnetic field of the earth and is securely locked in this position. At this point the aircraft, the compass of which is to be corrected, is moved into position surmounting and preferably with the center section approximately straddling the device. Fitting 39 is then secured to the belly of the aircraft, thereby locking lubber line 32 into registry with the longitudinal axis of the aircraft. Inasmuch as disc 31 is then immobilized with respect to the aircraft but is freely turnable with respect to disc 15, the actual magnetic heading of the aircraft may be determined by an operator reading the graduation of the compass rose which is coincident with lubber line 32. This reading is then communicated to the operator of the aircraft, who records it and simultaneously records the heading indicated by the aircraft's magnetic compass. The difference between the two is of course the deviation easterly or westerly, as the case may be, on the particular heading. As soon as one reading has been made, the aircraft is turned through a desired angle, either by use of the propellers or use of a tractor. During this operation the operator of the instrument indicates to the operator of the aircraft, by appropriate signals, which brake should be held or which released, to keep the aircraft in position in which fitting 39 is roughly centered with respect to the device. As soon as the aircraft has been moved through the desired angle, it is again stopped. The actual magnetic heading is again read from the instrument and recorded by the aircraft operator, who simultaneously records the compass heading. This process is repeated until the compass has been "swung" throughout an over-all angle of 360°. The method of preparing a suitable chart or card from the data so obtained will be obvious. If the angular movements of the aircraft have been predetermined to coincide with the principal magnetic headings, the deviation card may be directly prepared from the data obtained; otherwise a complete curve of the deviation over a 360° range can be prepared and the deviation for the principal magnetic headings taken from this curve.

For convenience in carrying out these operations, the operator of the instrument and the operator of the aircraft may communicate with each other through a portable telephone system.

It will be obvious that within the broad principle hereinabove described, the instrument can be so modified that its readings will be within the immediate field of vision of the person in the cockpit who is compensating the compass, thereby dispensing with the necessity for the ground observer.

I claim:

1. Device for determining the deviation of compasses installed in aircraft consisting of a unitary portable device comprising a support, an azimuth ring horizontally mounted on said support and turnable in a horizontal plane, a pivotal mounting carried by said azimuth ring, a compass needle carried by said pivotal mounting, means defining a lubber line concentric with, resting on, and freely turnable with respect to said azimuth ring, a fitting adapted to be coupled to the underbody of an airplane, and means transmitting turning movement of said fitting in a horizontal plane to said means defining including a bar extending from said means defining to a point over the center of said azimuth ring and a shaft extending in a substantially vertical direction between said fitting and the part of said bar which is over the center of said azimuth ring.

2. Device according to claim 1 in which said means transmitting includes a flexible shaft connecting said fitting with said means for turning.

3. Device for determining the deviation of compasses installed in aircraft, consisting of a unitary portable device comprising a support, an azimuth ring horizontally mounted on said support and turnable in a horizontal plane, means locking said azimuth ring against turning, a pivotal mounting carried by said azimuth ring, a compass needle carried by said pivotal mounting, means defining a lubber line concentric with, resting on, and freely turnable with respect to said azimuth ring, a fitting adapted to be coupled to the underbody of an airplane and means transmitting turning movement of said fitting in a horizontal plane to said means defining including a bar extending from said means defining to a point over the center of said azimuth ring and a shaft extending in a substantially vertical direction between said fitting and the part of said bar which is over the center of said azimuth ring.

4. Device according to claim 3 in which said means transmitting includes a flexible shaft connecting said fitting with said means for turning.

References Cited in the file of this patent

UNITED STATES PATENTS

| 1,947,434 | Rhea | Feb. 13, 1934 |
| 2,509,116 | Wakefield | May 23, 1950 |

FOREIGN PATENTS

| 934,900 | France | Jan. 19, 1948 |